US010075980B2

(12) United States Patent
Sun et al.

(10) Patent No.: US 10,075,980 B2
(45) Date of Patent: Sep. 11, 2018

(54) METHODS, APPARATUSES, USER EQUIPMENT, RADIO NETWORK NODE, AND COMPUTER PROGRAM PRODUCT FOR RANDOM ACCESS PROCEDURES

(71) Applicant: Telefonaktiebolaget L M Ericsson (publ), Stockholm (SE)

(72) Inventors: Zhenglin Sun, Jiangsu (CN); Rui Fan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 133 days.

(21) Appl. No.: 14/653,732

(22) PCT Filed: Dec. 26, 2012

(86) PCT No.: PCT/CN2012/087563
§ 371 (c)(1),
(2) Date: Jun. 18, 2015

(87) PCT Pub. No.: WO2014/101012
PCT Pub. Date: Jul. 3, 2014

(65) Prior Publication Data
US 2015/0334746 A1    Nov. 19, 2015

(51) Int. Cl.
*H04W 74/08* (2009.01)
*H04W 72/12* (2009.01)
(Continued)

(52) U.S. Cl.
CPC ...... *H04W 74/0833* (2013.01); *H04B 17/309* (2015.01); *H04L 1/0026* (2013.01); *H04W 72/1236* (2013.01); *H04L 1/0003* (2013.01)

(58) Field of Classification Search
None
See application file for complete search history.

(56) References Cited

U.S. PATENT DOCUMENTS 8,565,689 B1 * 10/2013 Rubin ............... G06F 15/16
370/232
2009/0161613 A1 * 6/2009 Kent ............... H04L 1/0016
370/329
(Continued)

FOREIGN PATENT DOCUMENTS

CN    101175309    5/2008
CN    101911543    12/2010
(Continued)

OTHER PUBLICATIONS

EP office action in application No. 12890890.2 dated Aug. 8, 2016, 5 pages.
(Continued)

*Primary Examiner* — Ayaz Sheikh
*Assistant Examiner* — Mariela Vidal Carpio
(74) *Attorney, Agent, or Firm* — Patent Portfolio Builders, PLLC

(57) ABSTRACT

Methods, apparatuses, a user equipment, a radio network node, and a computer program product for a random access procedure are provided. One of the methods comprises receiving, from a radio network node, a random access response message including a request for channel quality information. The method also comprises transmitting to the radio network node a scheduled transmission message including the requested channel quality information which is used by the radio network node to perform link adaptation for transmission of a contention resolution message. With the methods, apparatuses, user equipment, radio network node, and computer program product, the physical resources unreasonably occupied due to an improper modulation and coding scheme can be saved and may be used by other user equipments during the random access procedure, resulting in more stable cell throughput.

13 Claims, 4 Drawing Sheets

(51) Int. Cl.
*H04L 1/00* (2006.01)
*H04B 17/309* (2015.01)

(56) References Cited

U.S. PATENT DOCUMENTS

| | | | |
|---|---|---|---|
| 2009/0181712 A1* | 7/2009 | Xu | H04L 1/0026 455/522 |
| 2009/0186613 A1* | 7/2009 | Ahn | H04L 5/003 455/434 |
| 2010/0103889 A1* | 4/2010 | Kim | H04W 74/004 370/329 |
| 2011/0009139 A1* | 1/2011 | Nagata | H04W 24/10 455/509 |
| 2011/0188599 A1* | 8/2011 | Kang | H04B 7/02 375/267 |
| 2013/0121312 A1* | 5/2013 | Roman | H04B 7/0486 370/335 |
| 2014/0126409 A1* | 5/2014 | Ahn | H04L 5/0007 370/252 |
| 2014/0126476 A1* | 5/2014 | Kang | H04L 1/0026 370/328 |
| 2014/0185543 A1* | 7/2014 | Kang | H04B 7/0626 370/329 |
| 2014/0321313 A1* | 10/2014 | Seo | H04J 11/00 370/252 |

FOREIGN PATENT DOCUMENTS

| | | |
|---|---|---|
| CN | 102065530 | 5/2011 |
| WO | 2008024788 A2 | 2/2008 |
| WO | 2009088739 A1 | 7/2009 |

OTHER PUBLICATIONS

PCT Notification of Transmittal of the International Search Report and the Written Opinion of the International Searching Authority, or the Declaration for International application No. PCT/CN2012/087563, dated Oct. 3, 2013.

3GPP TS 36.213 V10.5.0; 3rd Generation Partnership Project; Technical Specification Group Radio Access Network; Evolved Universal Terrestrial Radio Access (E-UTRA); Physical layer procedures (Release 10), Mar. 2012.

3GPP TS 36.321 V10.5.0; 3rd Generation Partnership Project; Technical Specification Group Radio Access Network; Evolved Universal Terrestrial Radio Access (E-UTRA); Medium Access Control (MAC) protocol specification (Release 10), Mar. 2012.

3GPP TS 36.331 V10.5.0; 3rd Generation Partnership Project; Technical Specification Group Access Network; Evolved Universal Terrestrial Radio Access (E-UTRA); Radio Resource Control (RRC); Protocol specification (Release 10), Mar. 2012.

EP Office Action in application No. 12890890.2 dated Feb. 16, 2017, 3 pages.

* cited by examiner

METHODS, APPARATUSES, USER EQUIPMENT, RADIO NETWORK NODE, AND COMPUTER PROGRAM PRODUCT FOR RANDOM ACCESS PROCEDURES

PRIORITY

This nonprovisional application is a U.S. National Stage Filing under 35 U.S.C. § 371 of International Patent Application Serial No. PCT/CN2012/087563, filed Dec. 26, 2012, and entitled "METHODS, APPARATUSES, USER EQUIPMENT, RADIO NETWORK NODE, AND COMPUTER PROGRAM PRODUCT FOR RANDOM ACCESS PROCEDURES."

TECHNICAL FIELD

Embodiments of the present invention generally relate to wireless communication techniques. More particularly, embodiments of the present invention relate to methods, apparatuses, a user equipment (UE), a radio network node and a computer program product for a random access procedure.

BACKGROUND

The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

A random access procedure is a fundamental procedure for a UE to have access to a wireless network, such as a long term evolution (LTE) network. The UE may perform a random access procedure upon occurrences of the following exemplary situations: when the UE performs an initial connection with the radio network node (e.g., base station, BS) if there is no connection (e.g., a radio resource control (RRC) connection); when the UE first accesses a target cell in a handover procedure; when requested by a command from the BS; when time synchronization of the uplink does not match, or the designated radio resources to be used for requesting radio resources have not been allocated, but data of the uplink is generated; and a recovery procedure when there is a radio link failure or handover failure.

In the LTE system, such random access procedures can be divided into a contention based random access procedure and a non-contention based random access procedure. Such division relies on whether the random access preamble used during the random access procedure is selected by the UE itself or selected by the BS.

In the non-contention based random access procedure, the UE uses the random access preamble that was directly allocated to it by the BS. Thus, when the BS allocates a particular random access preamble to the UE, only that UE uses such random access preamble and other UEs cannot use this random access preamble. Thus, because the random access preamble and the UE utilizing that random access preamble have a one-to-one relationship, there are no collisions (or contentions) in the random access procedure. In this case, once such random access preamble is received by the BS, the identity of a UE that transmitted the random access preamble can be known.

In contrast, in the contention based random access procedure, among a plurality of random access preambles that the UE can use, one is randomly chosen and transmitted, and thus there is likelihood that a plurality of UEs may use the same random access preamble. Thus, upon receipt of a particular random access preamble, the BS is not able to ascertain which UE transmitted such random access preamble.

For a better understanding of the random access procedure, exemplary descriptions will be made to the contention based random access procedure in connection with FIG. 1.

FIG. 1 illustrates a flow chart of the contention based random access procedure 100 between the UE and the BS. As illustrated in FIG. 1 and also as mentioned above, based on the indication of a group of random access preambles provided through system information or a handover command, the UE randomly selects one random access preamble and then selects physical random access channel (PRACH) resources that can be used to transmit such a random access preamble, and performs transmission of the random access preamble at step S101. Here, the preamble may be referred to as a random access channel (RACH) message (MSG) 1.

Subsequent to transmitting the random access preamble as above, the UE, at step S102, receives its random access response message (also referred to as "RACH MSG 2") within a random access response reception window that was indicated by system information or handover command from the BS. Here, the random access response message includes values such as a preamble identifier (ID), a UL Grant (uplink radio resources), a temporary Radio Network Temporary Identifier (TC-RNTI), and a time alignment command, and the like. Here, if a random access preamble identifier is needed, and because random access response information intended for one or more UEs can be included in a single random access response, the UL grant, temporary C-RNTI, and Time Alignment Command information are used to inform of the UE for which such information is valid. The random access preamble identifier is the same as the random access preamble that was selected in the procedures mentioned above.

Upon receipt of the valid random access response at step S102, the UE processes the information included in the random access response respectively. For example, the UE applies the Time Alignment Command and stores the temporary C-RNTI. Additionally, by using the UL Grant, the data stored in the buffer of the UE or newly generated data are transmitted to the BS at step S103 via a scheduled transmission message, which is also referred to as a RACH MSG 3. Among the data included in the RACH MSG 3, the identifier of the UE should essentially be included such that the BS can determine which UEs performed the random access procedure and identifying each UE allows future collisions to be resolved. Generally, if the UE transmitted the scheduled transmission message through the UL Grant, a contention resolution timer would be started.

Following scheduled transmission of step S103, the UE waits for instructions from the BS for contention resolution (or to resolve any contention). Namely, an attempt to receive a contention resolution message (also referred to as MSG 4) over the PDCCH is made. There may be two ways to receive the contention resolution message over the PDCCH at step S104. The first way is to attempt PDCCH reception by using the cell identifier, if the cell identifier is its identifier that was transmitted via the UL Grant. The second way (i.e. if its identifier is a unique identifier) is to use the Temporary C-RNTI included in the random access response in attempting to receive the PDCCH.

In the above first way, if the PDCCH is received through its cell identifier before expiration of the contention resolution timer, the UE determines that the random access procedure was performed successfully. In the above second way, if the PDCCH was received through the temporary cell identifier before expiration of the contention resolution timer, the data within the Physical Downlink Shared Channel (PDSCH) is checked according to the indication of the PDCCH. The data within the PDSCH is referred to as RACH MSG 4. If the above data includes its unique identifier, the UE determines that the random access procedure was performed successfully.

The foregoing briefly introduces the random access procedure in which related four messages have been discussed. As to the MSG 4 therein, the eNB is likely to choose a conservative Modulation and Coding Scheme (MCS) and thus assign the fixed number of PRBs for transmission of the MSG 4. In general, this conservative MCS is unreasonable for transmission of the MSG 4 since it may occupy superfluous Physical Resource Blocks (PRBs) and thus the scare resources would be unnecessarily wasted. As a result, either the throughput of the UEs that are not in the random access procedures will be negatively affected or the random access delay of the UEs during the random access procedures will be lengthened.

In view of the foregoing, it would be desirable to provide solutions that enable highly efficient random access procedures such that PRBs for transmission of the MSG 4 can be reasonably assigned and potential waste of the PRB in this regard could be avoided.

SUMMARY

To address or mitigate at least one of the above potential problems, certain embodiments of the present invention would provide for an efficient way of performing random access procedures such that the physical resources for transmission of the MSG 4 can be efficiently assigned and chosen and resource waste in this regard could be avoided. Further, the saved physical resources could be used by other UEs during the random access procedures and thus less delay of the random access procedures could be achieved, thereby giving whole performance and throughput of a wireless network a big boost.

According to an embodiment of the present invention, there is provided a method for a random access procedure at a UE. The method comprises the steps of receiving from a radio network node a random access response message including a request for channel quality information. The method also comprises the step of transmitting to the radio network node a scheduled transmission message including the requested channel quality information which is used by the radio network node to perform LA for transmission of a contention resolution message.

According to another embodiment of the present invention, there is provided a method for a random access procedure at a radio network node. The method comprises the step of transmitting to a UE a random access response message including a request for channel quality information. The method also comprises the step of receiving from the UE a scheduled transmission message including requested channel quality information. The method further comprises the step of performing LA based on the requested channel quality information. In addition, the method comprises the step of transmitting to the UE a contention resolution message based on a result of the LA.

According to an embodiment of the present invention, there is provided a user equipment. The user equipment comprises a receiver configured to receive from a radio network node a random access response message including a request for channel quality information. The user equipment further comprises a transmitter configured to transmit to the radio network node a scheduled transmission message including the requested channel quality information which is used by the radio network node to perform LA for transmission of a contention resolution message.

According to another embodiment of the present invention, there is provided a radio network node. The radio network node comprises a transmitting unit configured to transmit to a UE a random access response message including a request for channel quality information. The radio network node also comprises a receiving unit configured to receive from the UE a scheduled transmission message including requested channel quality information. The radio network node further comprises a performing unit configured to perform LA based on the requested channel quality information. The transmitting unit is further configured to transmit to the UE a contention resolution message based on a result of the LA.

According to an embodiment of the present invention, there is provided a radio network node. The radio network node comprises at least one processor and at least one memory storing program of computer executable instructions and the computer executable instructions configured, with the at least one processor, to cause the radio network node to at least perform the methods according to embodiments of the present invention as set forth above and discussed later.

According to another embodiment of the present invention, there is provided a computer program product. The computer program product comprises at least one computer readable storage medium having a computer readable program code portion stored thereon, the computer readable program code portion comprising program code instructions for performing the methods according to embodiments of the present invention as set forth above and discussed later.

According to the embodiments of the present invention as presented above, based on the channel quality information from the UE, the radio network node (e.g., BS) is able to perform the LA and select a proper MCS and a number of PRBs for transmission of the MSG 4. Thereby, the physical resources unreasonably occupied due to an improper MCS can be saved and may be used by other UEs during the random access procedure, resulting in more stable cell throughput. Further, due to this resource saving and full utilization, the potential random access delay would be shortened when multiple UEs conduct the respective random access simultaneously.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention may be applied in various wireless networks, including but not limited to the third Generation Partnership Project (3GPP) LTE network. Given the rapid development in communications, there will of course also be future type wireless communication technologies and systems with which the present invention may be embodied. It should not be seen as limiting the scope of the invention to only the aforementioned system.

Figure 1:
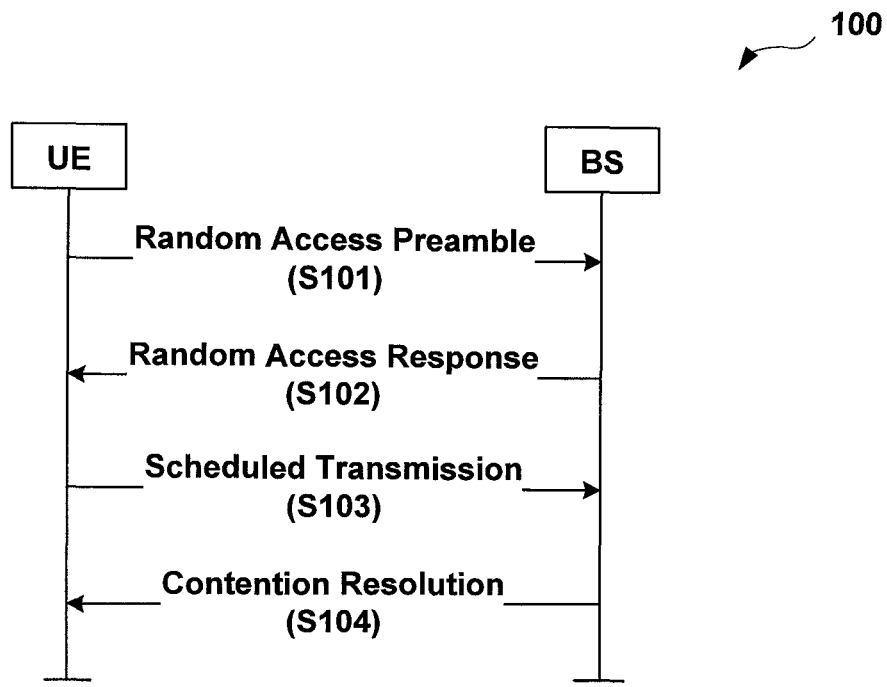
FIG. 1 schematically illustrates a normal random access procedure between a UE and a BS, in which inefficient transmission of the MSG 4 may arise.

FIG. 1 schematically illustrates a normal random access procedure 100 between a UE and a BS, in which inefficient transmission of the MSG 4 may arise. Descriptions regarding this normal random access procedure and their potential problems have been made before and thus additional descriptions are omitted herein for simplicity's sake.

Figure 2:
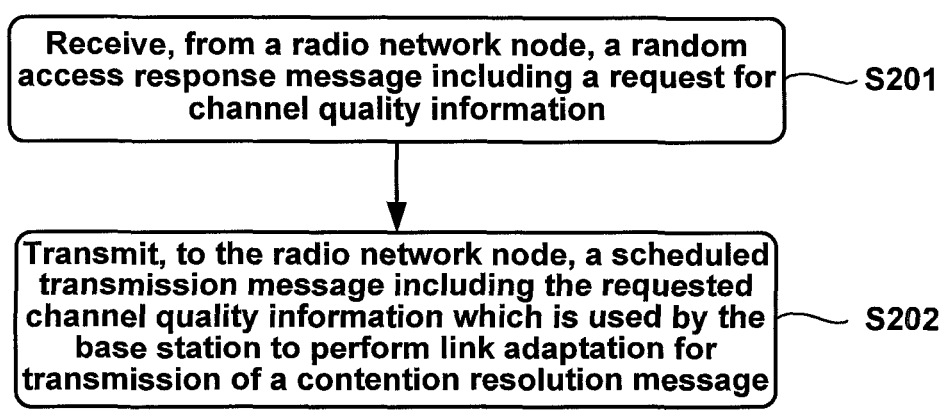
FIG. 2 schematically illustrates a flow chart of a method for a random access procedure according to an embodiment of the present invention from the standpoint of a UE.

FIG. 2 schematically illustrates a flow chart of a method 200 for a random access procedure according to an embodiment of the present invention from the standpoint of a UE. At step S201, the method 200 receives, from a radio network node, a random access response message including a request for channel quality information. In some embodiments, the channel quality information may include at least one of wideband channel quality information and subband channel quality information, which may be obtained by e.g., measuring downlink reference signals. In some embodiments, the method 200 receives, prior to the step S201 of receiving the random access response message, a system information block (SIB) from the radio network node, wherein the SIB includes an indicator indicating that at least one of the wideband channel quality information and the subband channel quality information is requested by the radio network node. In other words, the radio network node can explicitly indicate, by broadcasting the SIB, to the UE that at least one of the wideband channel quality information and the subband channel quality information is expected. Alternatively, the random access response message may directly include an indicator indicating that at least one of the wideband channel quality information and the subband channel quality information is requested by the radio network node.

Upon receipt of the random access response message from the radio network node, the method 200 proceeds to step S202, at which the method 200 transmits to the radio network node a scheduled transmission message including the requested channel quality information which is used by the radio network node to perform LA for transmission of a contention resolution message. In some embodiments, the requested channel quality information may be characterized by at least one channel quality indicator (CQI) and thus a single wideband CQI and multiple subband CQIs may be included in one of a MAC control element (CE) and a MAC protocol data unit (PDU) in the scheduled transmission message. The CQI may indicate a code rate that can be supported by the channel after taking into account the Signal-to-Interference plus Noise Ratio (SINR) and the characteristics of the UE's receiver.

The foregoing has discussed the method 200 and its multiple variants and extensions according to the embodiments of the present invention. With the method 200, upon receipt of the requested channel quality information, the radio network node is able to select the proper MCS and PRBs for transmission of the MSG 4, thereby avoiding resource waste and advantageously providing more efficient use of radio resources.

Figure 3:
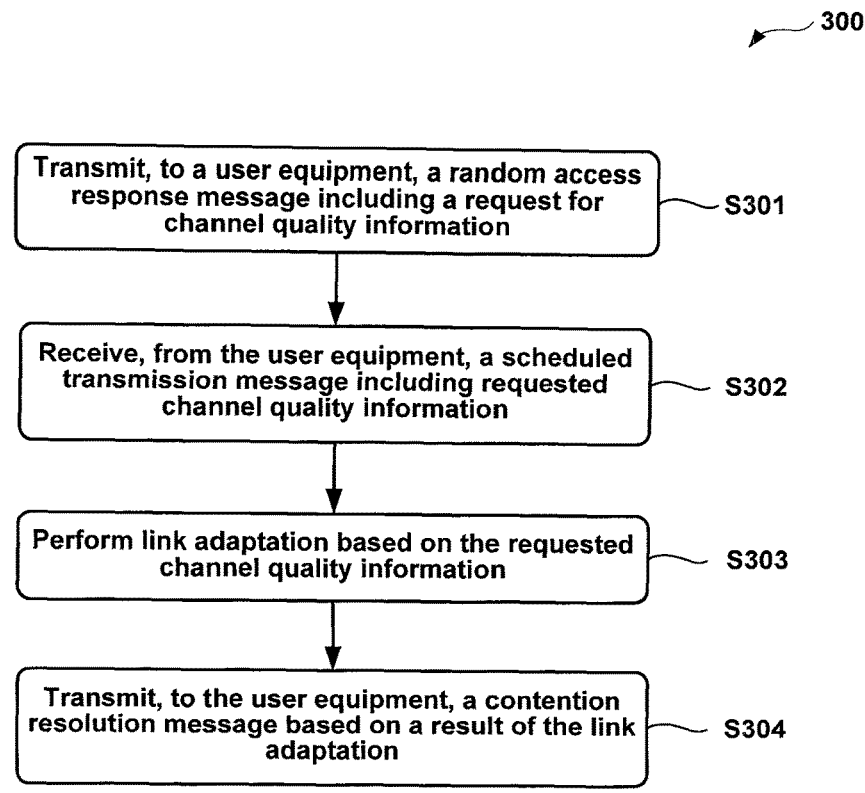
FIG. 3 schematically illustrates a flow chart of a method for a random access procedure according to an embodiment of the present invention from the standpoint of a radio network node.

FIG. 3 schematically illustrates a flow chart of a method 300 for a random access procedure according to an embodiment of the present invention from the standpoint of a radio network node. As illustrated in FIG. 3, at step S301, the method 300 transmits to a UE a random access response message including a request for channel quality information. Similar to the method 200, in some embodiments, the channel quality information may include at least one of wideband channel quality information and subband channel quality information.

Although not shown in FIG. 3, in some other embodiments, the method 300 transmits, prior to the step S301 of transmitting the random access response message, a SIB to the UE, wherein the SIB includes an indicator indicating that at least one of the wideband channel quality information and the subband channel quality information is requested by the radio network node. Alternatively, the random access response message as transmitted at step S301 may directly include an indicator indicating that at least one of the wideband channel quality information and the subband channel quality information is requested by the radio network node. Through the above manners, it is more purposeful to obtain different kinds of quality information as appropriate.

At step S302, the method 300 receives from the UE a scheduled transmission message including requested channel quality information. In some embodiments, the requested channel quality information may be characterized by at least one CQI and thus a single wideband CQI or multiple subband CQIs may be included in one of a MAC CE and a MAC PDU in the scheduled transmission message.

Upon receipt of the scheduled transmission message, the method 300 proceeds to step S303, at which the method 300 performs LA based on the requested channel quality information. In some embodiments, the method 300 selects an MCS and a number of PRBs for transmitting the contention resolution message based on the requested channel quality information (e.g., wideband CQI or multiple subband CQIs).

After performance of the LA, the method 300 advances to step S304, at which the method 300 transmits to the UE a contention resolution message based on a result of the LA (e.g., a proper MCS and a number of PRBs). Because the selection of the MCS and PRBs is made by taking the channel quality information into account, a proper number of PRBs and MCS can be assigned and selected for transmission of the contention resolution message, i.e., the MSG 4 as discussed before.

The foregoing has discussed the method 300 and its multiple variants and extensions according to the embodiments of the present invention. With the method 300, upon receipt of the requested channel quality information, the radio network node is capable of conducting the LA and assigning proper PRBs for transmission of the MSG 4, thereby saving the resource that may be wasted due to an inappropriate MCS, for example, the conservative MCS as noted before.

Figure 4:
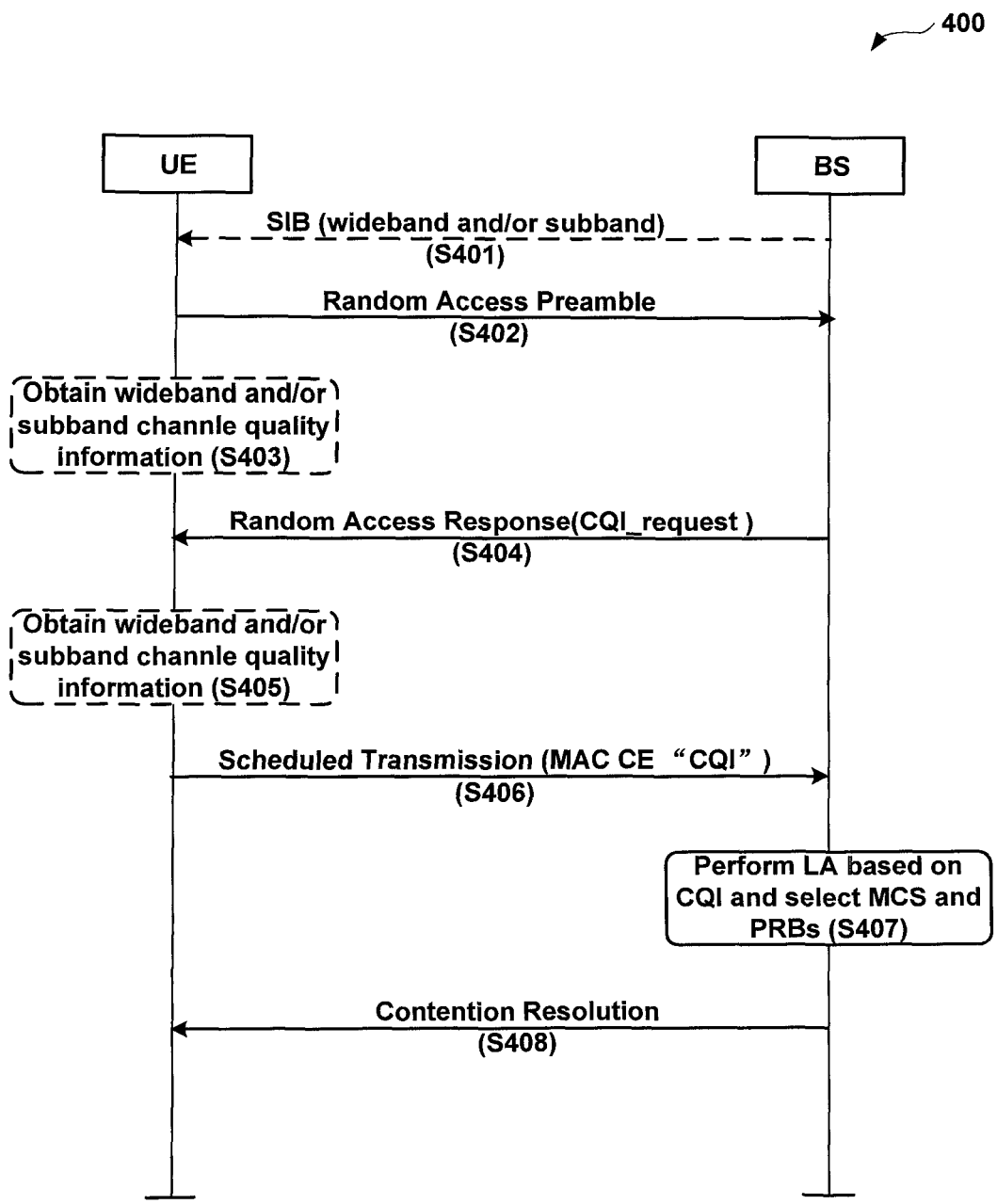
FIG. 4 schematically illustrates a signaling flow for a random access procedure between the UE and the BS according to an embodiment of the present invention.

FIG. 4 schematically illustrates a signaling flow 400 for a random access procedure between the UE and the BS according to an embodiment of the present invention. As illustrated in FIG. 4, the flow 400 begins at step S401, at which the BS transmits a SIB to the UE, wherein the SIB may include an indicator indicating that at least one of the wideband and subband channel quality information is requested. The SIB can be formed by extending RACH-ConfigCommon IE of system information as included in the 3GPP TS 36.331, V11.1.0 (2012-09), section 6.3.2 as below:
    ra-Msg3CQIType ENUMERATED {wideband, subband}.

After receiving the SIB at step S401, the flow 400 advances to step S402, at which a random access procedure commences with the UE transmitting a random access preamble (i.e., MSG 1) as randomly selected to the BS. After that, based on the received SIB, the UE may obtain the wideband channel quality information and/or the subband channel quality information at step S403. When the channel quality information is embodied as a CQI, the UE may obtain a wideband CQI for whole system bandwidth and multiple subband CQIs for a plurality of subbands by measuring corresponding downlink reference signals. For example, the UE may first determine, based on the received downlink reference signals, the highest MCS that it can decode with a transport block error rate (BLER) probability not exceeding 10% and then it would ascertain the CQI value corresponding to the MCS that ensures BLER≤$10^{-1}$.

Since the obtaining of the wideband or subband channel quality information may also be performed at step S405, the steps S401 and S403 which implement the obtaining at issue are optional and thus are illustrated in a dashed line and a dashed box, respectively.

Subsequent to obtaining the wideband and/or subband channel quality information at step S403 (optionally), the flow 400 proceeds to step S404 at which the BS transmits a random access response (i.e., MSG 2) to the UE.

In the random access response, there is a CQI/CSI request bit, which is described in the 3GPP TS 36.213, V11.0.0 (2012-09), section 6.2 as reproduced below:
"In non-contention based random access procedure, the CSI request field is interpreted to determine whether an aperiodic CQI, PMI, and RI report is included in the corresponding PUSCH transmission according to section 7.2.1. In contention based random access procedure, the CSI request field is reserved." (emphasis added)

According to the embodiments of the present invention, the bolded content as above would be modified as below if only the wideband CQI is requested by the BS, which may be indicated by the SIB as discussed at step S401:
"In contention based random access procedure, the CSI request field is interpreted to determine whether a wideband CQI report is included in the corresponding PUSCH transmission (MSG3) according to section 7.2.1, and the CQI report is transmitted in MSG3 MAC layer control element." (emphasis added)

Further, the above bolded content would be revised as below if both the wideband and subband CQIs are requested by the BS, which may likewise be indicated by the SIB as discussed at step S401:
"In contention based random access procedure, the CSI request field is interpreted to determine whether a wideband or subband CQI report is included in the corresponding PUSCH transmission (MSG3) according to section 7.2.1, and the CQI report is transmitted in MSG3 MAC layer control element." (emphasis added).

Instead of the optional SIB, the random access response (grant) message may also be extended to indicate that at least one of the wideband and subband channel quality information is requested by the BS. For example, when the channel quality information is embodied as a CQI, the random access response grant as described in the 3GPP TS 36.213, V11.0.0 (2012-09), section 6.2, can be extended as below so as to achieve such indication:

The content of these 20 bits starting with the MSB and ending with the LSB are as follows:
    Hopping flag—1 bit
    Fixed size resource block assignment—10 bits
    Truncated modulation and coding scheme—4 bits
    TPC command for scheduled PUSCH—3 bits
    UL delay 1 bit
    CSI request—1 bit
    Wideband or Subband CQI—1 bit (emphasis added)

Upon receipt of the random access response including the above indication, the UE may perform, at step S405, the same or similar operations as the step S403, i.e., obtaining the wideband and/or subband channel quality information by measuring the corresponding downlink reference signals. Because the S405 is an alternative to the steps S401 and S403, it is also be illustrated by a dashed box.

Afterwards, the flow 400 proceeds to step S406, at which the UE transmits to the BS a scheduled transmission message (i.e., MSG 3) which includes the requested channel quality information. According to the embodiments of the present invention, when the channel quality information is characterized by the CQI, it can be included in for example, a MAC CE or a MAC PDU. When included in the MAC CE, the CQI according to the embodiments can be divided into the MAC CE wideband CQI and the MAC CE subband CQI, which can be regarded as extensions to MAC CEs as described in the 3GPP TS 36.321, V11.0.0 (2012-09), section 6.1.3. Correspondingly, two new Logical Channel Identifies (LCID) values, e.g., 01011 and 01100, could be introduced to the Table 6.2.1-2 to indicate the "MAC CE wideband CQI" and "MAC CE subband CQI," respectively.

Regarding the MAC CE wideband CQI, it may have a fixed size and consist of a single octet defined as follows:

| R | R | R | R | wideband CQI |
|---|---|---|---|---|

R: reserved bit, set to "0"; and wideband CQI: This field indicates CQI indexes (0, 1, 2, . . . , 15) which reflect different levels of channel quality. The length of the field is 4 bits.

Regarding the MAC CE subband CQI, it may reuse the same principle described in the 3GPP TS 36.213, V11.0.0 (2012-09) 7.2.1, CQI report mode 3-0. That is, the UE reports one wideband CQI plus one subband CQI for each subband. The wideband CQI still consists of 4 bits while subband CQI values are encoded differentially with respect to their respective wideband CQI using 2 bits (see Table 7.2.1-2). The number of subband depends on system bandwidth (see Table 7.2.1-3). One example for 20 MHz system bandwidth (13 subbands in total) subband CQI report is illustrated as below, where in total 4 bytes are needed.

| R | R | Wideband CQI | | Subband0 CQI | Octet1 |
|---|---|---|---|---|---|
| Subband1 CQI | Subband2 CQI | Subband3 CQI | | Subband4 CQI | Octet2 |
| Subband5 CQI | Subband6 CQI | Subband7 CQI | | Subband8 CQI | Octet3 |
| Subband9 CQI | Subband10 CQI | Subband11 CQI | | Subband12 CQI | Octet4 |

Now turning back to the flow 400, upon parsing and obtaining the channel quality information (e.g., CU) from the scheduled transmission message, the BS performs the LA based on the CQI and selects, as a result of the LA, a proper MCS and a number of PRBs for transmission of the MSG 4 at step S407. Then, the flow 400 advances to step S408, at which the BS transmits the contention resolution message (i.e., MSG 4) to the UE using the proper MCS and PRBs corresponding to the reported CQI Regarding the MSG 4, a typical one may include a Downlink Dedicated Control Channel (DL-DCCH) message in the LTE system, for example, an RRCConnectionSetup message having 256 bits. According to the principle as described in 3GPP TS 36.213, V11.0.0 (2012-09) section 7.1.7 and Table 7.1.7.1-1: Modulation and TBS index table for PDSCH, a typical mapping of Transport Block Size Indexes (TBSIs), MCS indexes (MCSIs), and the number of PRBs for the 256-bit TB is exemplarily illustrated in the table as below.

| TBSI | MCSI | PRB number |
|---|---|---|
| 0 | 0 | 10 |
| 1 | 1 | 8 |
| 2 | 2 | 6 |
| 3 | 3 | 5 |
| 4 | 4 | 4 |
| 6 | 6 | 3 |
| 8 | 8 | 2 |
| 14 | 15 | 1 |

As seen from the above table, for an MSG 4 with 256-bit size, the selection range of the PRB can be varied from 1 PRB to 10 PRBs with the MCSI from 0 to 15 and TBSI from 0 to 14, and a selected 2-tuple of <MCSI, PRB number>fulfills the requirement of the TB size being greater than or equal to 256 bits. Thereby, for example, when a TBSI 3 is selected, a corresponding MCSI 3 is also determined and 5 PRBs would be selected to match the code rate that is determined by the CQI according to 3GPP TS 36.213, V11.0.0 (2012-09) section 7.1.7 Table 7.2.3-1. As such, the MSG 4 can be more flexibly transmitted using an adaptive number of PRBs than using the fixed number of PRBs, thereby enabling efficient management and use of the PRB resources.

The foregoing has discussed in connection with FIG. 4 some details of the methods 200 and 300, which may involve further implemental details or variants than indicated herein; however, the present invention is not limited thereto. Further, it should be noted herein that the steps as illustrated FIG. 4 are only examples and are not restrictive to the present invention. Those skilled in the art, after reading the present specification, can change these steps by combining, adding certain steps or change a sequence of steps, so as to meet different application demands. For example, although the step S403 is illustrated as subsequent to the step S402, it can directly follow the step S401. Simply put, the step S403 can be performed prior to or subsequent to the transmission of the random access preamble.

Figure 5:
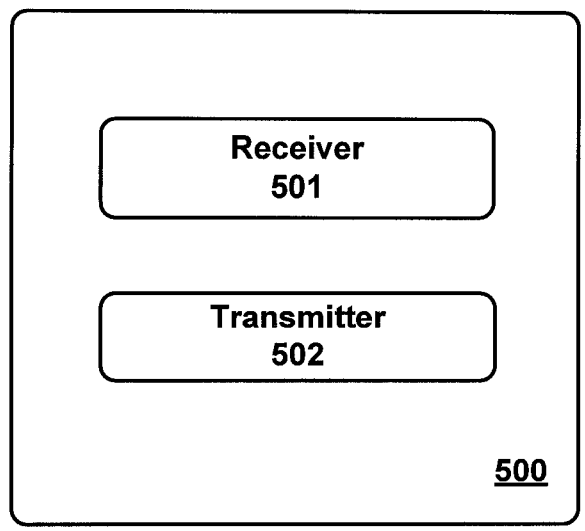
FIG. 5 is a simplified schematic block diagram illustrating a UE according to embodiments of the present invention.

Attention is now directed to FIG. 5, in which a simplified schematic block diagram illustrates a UE 500 according to embodiments of the present invention. As illustrated in FIG. 5, the UE 500, among other things, comprises a receiver 501 and a transmitter 502. The receiver 501 is configured to receive from a radio network node a random access response message including a request for channel quality information. The transmitter 502 is configured to transmit to the radio network node a scheduled transmission message including the requested channel quality information which is used by the radio network node to perform LA for transmission of a contention resolution message. It can be understood that the UE 500 is capable of carrying out the method 200 as discussed previously.

Figure 6:
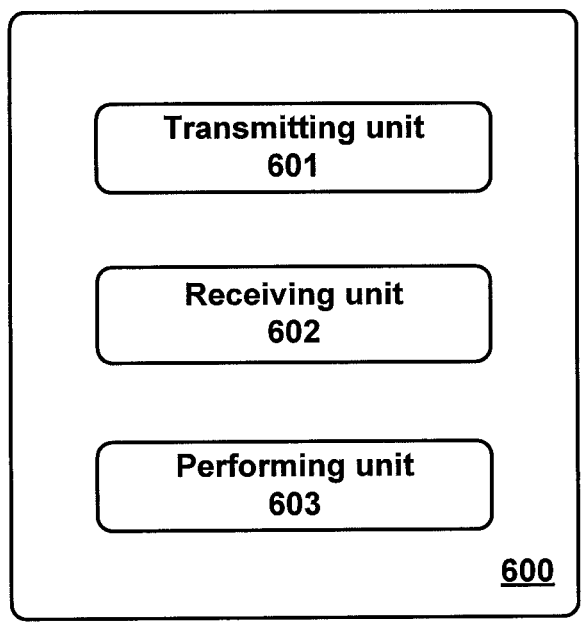
FIG. 6 is a simplified schematic block diagram illustrating a radio network node according to embodiments of the present invention.

FIG. 6 is a simplified schematic block diagram illustrating a radio network node 600 according to embodiments of the present invention. As illustrated in FIG. 6, the radio network node 600, among other things, comprises a transmitting unit 601, a receiving unit 602, and a performing unit 603. The transmitting unit 601 is configured to transmit, to a UE, a random access response message including a request for channel quality information. The receiving unit 602 is configured to receive, from the UE, a scheduled transmission message including requested channel quality information. The performing unit 603 is configured to perform LA based on the requested channel quality information. Further, the transmitting unit 601 is configured to transmit to the UE a contention resolution message based on a result of the LA. It can be understood that the radio network node 600 is capable of carrying out the method 300 as discussed previously. Additionally, the interaction between the UE 500 and the radio network node 600 may implement the method 400 as discussed in connection with FIG. 4.

Figure 7:
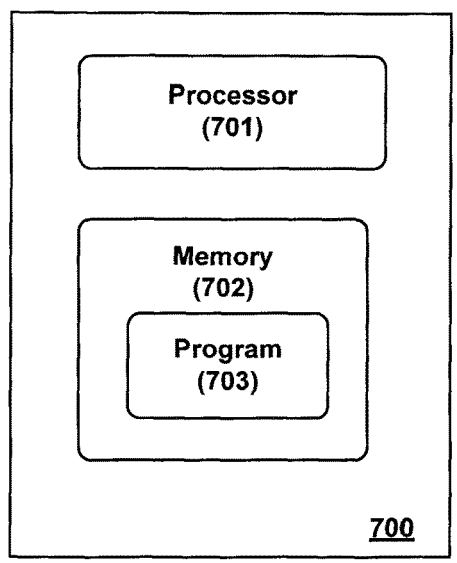
FIG. 7 is a simplified schematic block diagram illustrating a radio network node according to embodiments of the present invention.

FIG. 7 is a simplified schematic block diagram illustrating a radio network node 700 according to embodiments of the present invention. As illustrated in FIG. 7, the radio network node 700 comprises at least one processor 701 and at least one memory 702 storing program 703 of computer executable instructions, wherein the computer executable instructions are configured, with the at least one processor 701, to cause the radio network node 700 to at least perform according to the methods 300 and 400 (e.g., steps S401, S404, and S408) as discussed before.

Generally, the processor 701 is a central processing unit, but it may be an additional operation processor. The processor 701 may comprise a computer processor, application-specific integrated circuit (ASIC), field-programmable gate array (FPGA), and/or other hardware components that have been programmed in such a way to carry out embodiments of the present invention as discussed previously.

The memory 702 may include volatile and/or non-volatile memory and typically stores content, data, or the like. For example, the memory 702 may store computer program instructions such as software applications or operating systems, information, data, content, or the like for the processor 701 to perform steps associated with operation of the radio network node 700 in accordance with the embodiments. The memory may be, for example, random access memory (RAM), a hard drive, or other fixed data memory or storage device.

It will be appreciated that the invention may be implemented in any suitable form including hardware, software, firmware or any combination of these. The invention may optionally be implemented at least partly as computer software running on one or more data processors and/or digital signal processors. In addition, the invention may be implemented by a computer program product which may comprise at least one computer readable storage medium having a computer readable program code portion stored thereon, the computer readable program code portion comprising program code instructions for performing one of the methods 200-400 as discussed before.

The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the specification do not imply any specific order in which the features/steps must be worked. Rather, the steps/features may be performed in any suitable order.

The terminology used herein is for the purpose of describing particular embodiments only and is not intended to limit to the invention. As used herein, the singular forms "a," "an" and "the" are intended to comprise the plural forms as well, unless otherwise stated. It will be further understood that the terms "including," "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. A method for a random access procedure at a user equipment, the method comprising the steps of:
   receiving, from a radio network node, a random access response message including a request for channel quality information, wherein the channel quality information includes at least one of wideband channel quality information and subband channel quality information;
   receiving, prior to the step of receiving the random access response message, a system information block from the radio network node, wherein the system information block includes an indicator indicating that at least one of the wideband channel quality information and the subband channel quality information is to be sent to the radio network node; and
   transmitting, to the radio network node, a scheduled transmission message including the requested channel quality information which is used by the radio network node to perform link adaptation for transmission of a contention resolution message to the user equipment, wherein performing the link adaptation comprises selecting a Modulation and Coding Scheme (MCS) and an adaptive number of Physical Resource Blocks (PRB) for transmitting the contention resolution message to the user equipment based on the requested channel quality information, and
   wherein the channel quality information comprises at least one channel quality indicator (CQI), and wherein the at least one CQI indicates a code rate supported by the channel, the code rate based on a Signal-to-Interference plus Noise Ratio (SINR) of the channel and characteristics of a receiver of the user equipment.

2. The method as recited in claim 1, wherein the random access response message includes an indicator indicating that at least one of the wideband channel quality information and the subband channel quality information is requested by the radio network node.

3. The method as recited in claim 1, wherein at least one of the wideband channel quality information and the subband channel quality information is obtained by measuring a downlink reference signal.

4. The method as recited in claim 1, wherein the requested channel quality information is characterized by the at least one CQI.

5. The method as recited in claim 1, wherein the requested channel quality information is included in one of a media access control (MAC) control element and a MAC protocol data unit in the scheduled transmission message.

6. A non-transitory computer program product, comprising at least one computer readable storage medium having a computer readable program code portion stored thereon, the computer readable program code portion comprising program code instructions for performing the method as recited in claim 1.

7. A method for a random access procedure at a radio network node, the method comprising the steps of:
   transmitting, to a user equipment, a random access response message including a request for channel quality information, wherein the channel quality information includes at least one of wideband channel quality information and subband channel quality information;
   transmitting, prior to the step of transmitting the random access response message, a system information block to the user equipment, wherein the system information block includes an indicator indicating that at least one of the wideband channel quality information and the subband channel quality information is to be sent to the radio network node;

receiving, from the user equipment, a scheduled transmission message including the requested channel quality information;

performing link adaptation based on the requested channel quality information; and transmitting, to a user equipment, a contention resolution message based on a result of the link adaptation, wherein the step of performing the link adaptation comprises selecting a Modulation and Coding Scheme (MCS) and an adaptive number of Physical Resource Blocks (PRB) for transmitting the contention resolution message based on the requested channel quality information, and wherein the channel quality information comprises at least one channel quality indicator (CQI), and wherein the at least one CQI indicates a code rate supported by the channel, the code rate based on a Signal-to-Interference plus Noise Ratio (SINR) of the channel and characteristics of a receiver of the user equipment.

8. The method as recited in claim 7, wherein the random access response message includes an indicator indicating that at least one of the wideband channel quality information and the subband channel quality information is requested by the radio network node.

9. The method as recited in claim 7, wherein the requested channel quality information is characterized by the at least one CQI.

10. The method as recited in claim 7, wherein the requested channel quality information is included in one of a Media Access Control (MAC) control element and a MAC protocol data unit in the scheduled transmission message.

11. A radio network node, comprising:
at least one processor;
at least one memory storing program of computer executable instructions; and
the computer executable instructions configured, with the at least one processor, to cause the radio network node to at least perform the method as recited in claim 7.

12. A user equipment, comprising:
a receiver configured to receive, from a radio network node, a random access response message including a request for channel quality information, wherein the channel quality information includes at least one of wideband channel quality information and subband channel quality information, and wherein the receiver is further configured to receive, prior to receiving the random access response message, a system information block from the radio network node, the system information block including an indicator indicating that at least one of the wideband channel quality information and the subband channel quality information is to be sent to the radio network node; and a transmitter configured to transmit, to the radio network node, a scheduled transmission message including the requested channel quality information which is used by the radio network node to perform link adaptation for transmission of a contention resolution message to the receiver of the user equipment, wherein performing the link adaptation comprises selecting a Modulation and Coding Scheme (MCS) and an adaptive number of Physical Resource Blocks (PRB) for transmitting the contention resolution message to the receiver of the user equipment based on the requested channel quality information, and wherein the channel quality information comprises at least one channel quality indicator (CQI), and wherein the at least one CQI indicates a code rate supported by the channel, the code rate based on a Signal-to-Interference plus Noise Ratio (SINR) of the channel and characteristics of the receiver of the user equipment.

13. The user equipment as recited in claim 12, wherein the random access response message includes an indicator indicating that at least one of the wideband channel quality information and the subband channel quality information is requested by the radio network node.

* * * * *